3,426,441
ELECTRIC HAIR DRYER
Thomas J. Broski, Glen Ellyn, Ill., assignor to Helene Curtis Industries, Inc., a corporation of Illinois
Filed Jan. 30, 1967, Ser. No. 612,562
U.S. Cl. 34—48
Int. Cl. A45d 20/44; H05b 3/02, 1/02
24 Claims

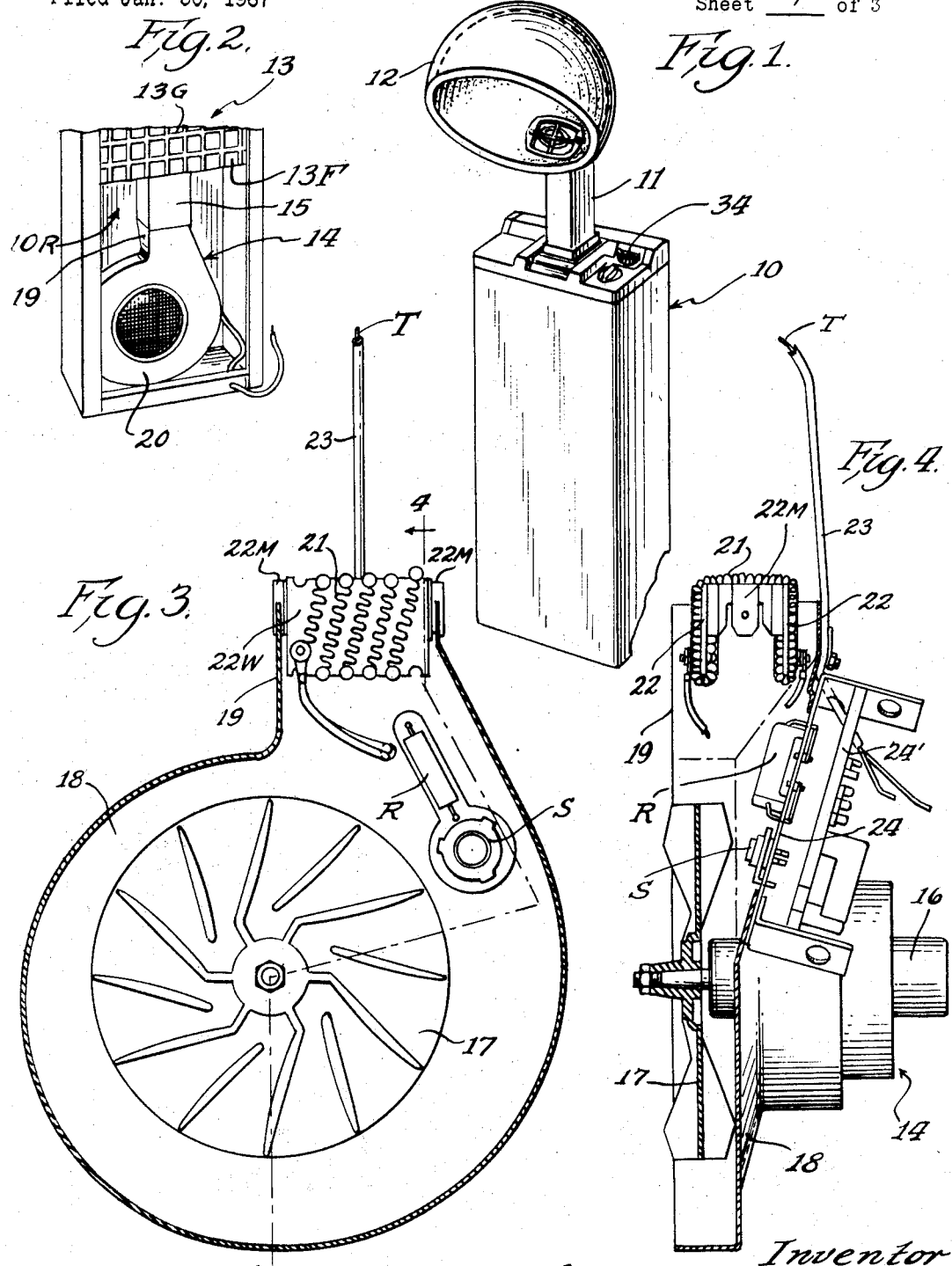

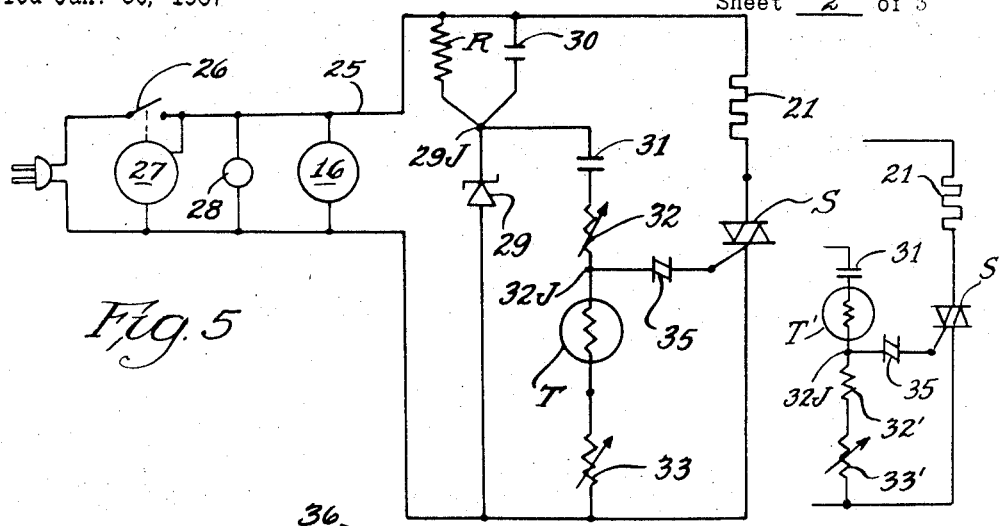
Fig. 5
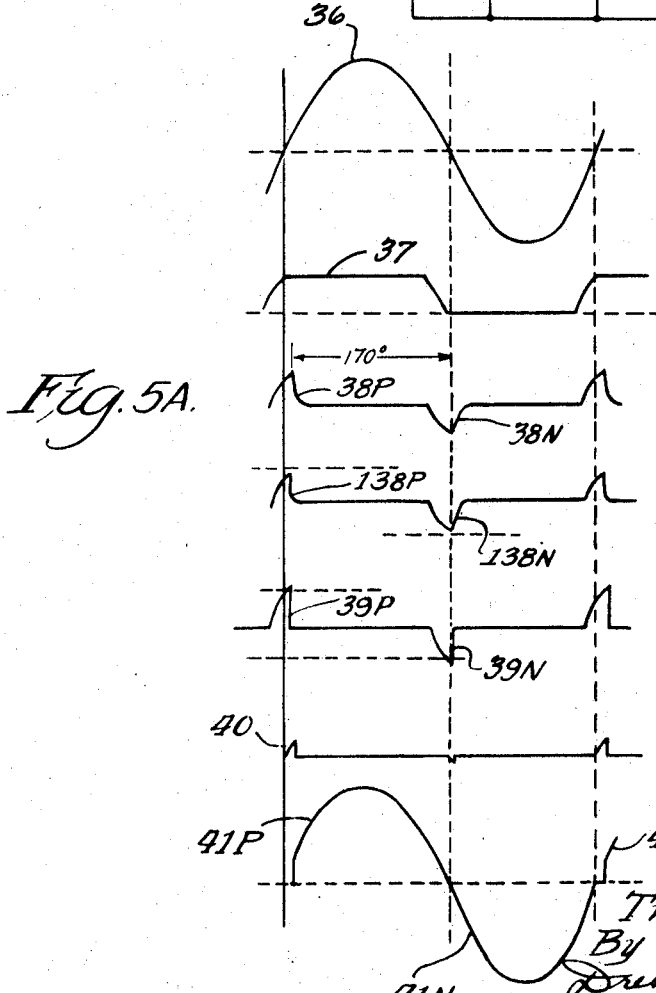
Fig. 5A.
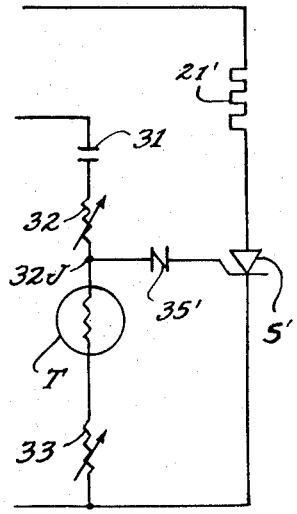
Fig. 6A.
Fig. 6.
Inventor
Thomas J. Broski
By Dressler, Goldsmith,
Clement and Gordon.
Attys.

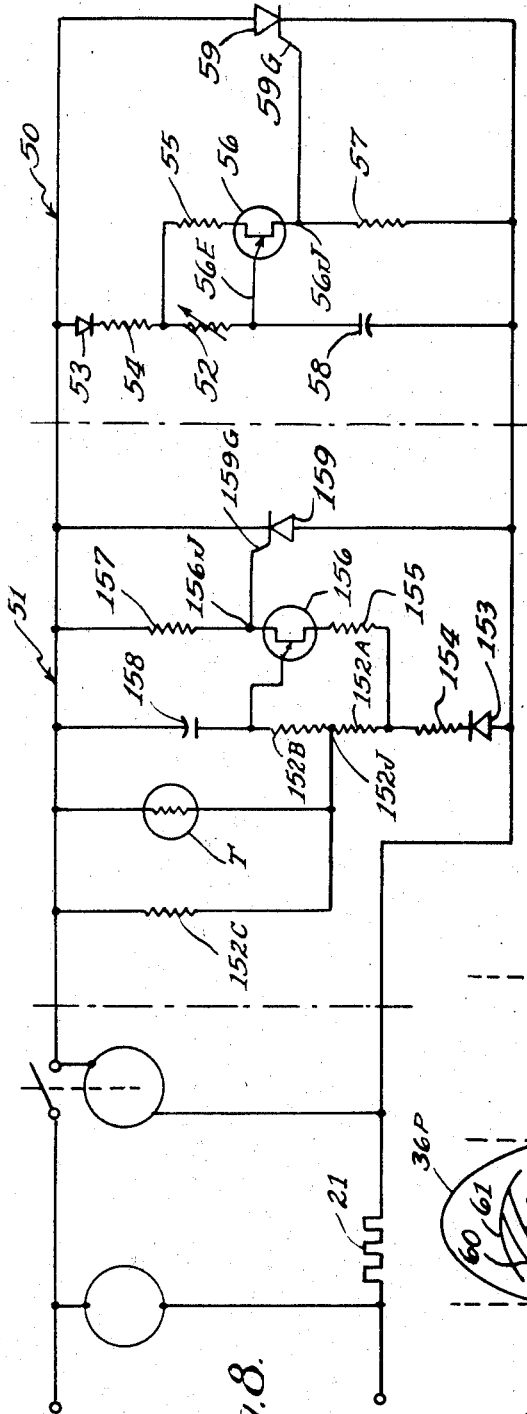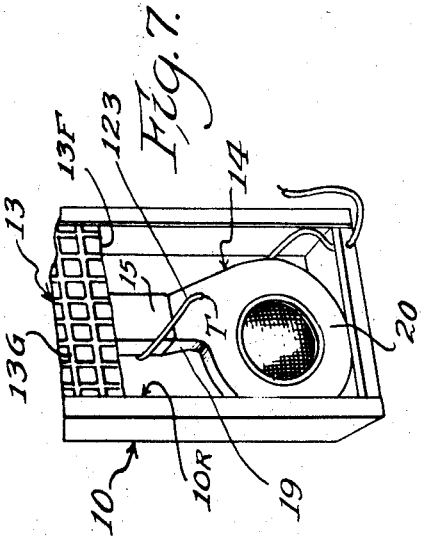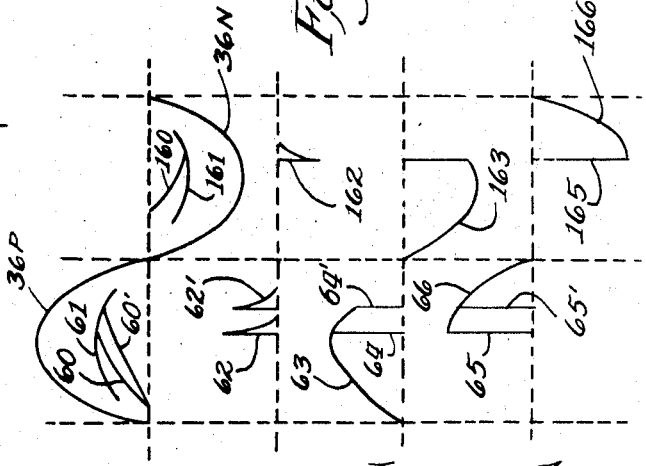

ABSTRACT OF THE DISCLOSURE

An electric hair dryer having a forced air stream heated by an electric resistance element mounted directly in stream and selectively energized under the control of a thermistor responsive to air temperature downstream of the heater element to afford rapid warm up and close regulation of the air temperature. A solid state circuit operating from conventional 60 cycle A.C. power generates switching pulses applied to the thermistor which, responsive to its temperature, energize a semiconductor switch during each cycle of the applied A.C. to govern the current to the resistance element.

---

This invention relates to an electric hair dryer and, more particularly, is concerned with an improved temperature control for regulating heating of the air stream.

Hair dryers take in air at room temperature and heat it to a temperature of about 120° F. to 135° F. according to the individual preference of each patron. At start up, the heater element loses heat to its mounting environment and hence is delayed in warming up to its desired operating temperature. When the heater comes up to temperature and shuts off, the stored heat in the heater mounting can cause excess temperature in the air stream.

In the prior art, therefore, the initial warm up period may take several minutes during which the patron is subjected to an uncomfortably cool air stream. As the air stream comes up to temperature, the heater turn off is unduly delayed and a substantial thermal overshoot of as much as 10° F. occurs. The patron is then subjected to an uncomfortably warm air stream. Upon continued operation, the air stream temperature cycles over an excursion range of 5° F. or more so that the patron is repeatedly subjected to cooler or warmer air temperatures than is preferred.

In the present invention, an arrangement is provided which provides almost immediate warm up with attainment of control temperature in about five seconds, minimal overshoot (generally not more than about 5° F.) and close regulation of instantaneous stream temperature (on the order of ±1° F.). In addition, the selected temperature is maintained independently of ambient temperature variations and normal supply voltage changes.

In one embodiment of this disclosure, an electric heater control circuit includes a heater element disposed in direct heat exchange relation with the air stream and a thermistor mounted downstream of the heater element to respond to the actual stream temperature and control the on-off cycling of the heater element.

The heater element is mounted directly in the stream on an isolation frame of low heat capacity, so as to accelerate initial warm up. However, this introduces a problem of control, because with a conventional bimetal thermostat, there is a greater tendency to overshoot, and the frequent operation of the thermostat causes its rapid deterioration and failure.

Solid state circuitry is provided for assuring reliable, long-lived operation. The circuitry is arranged for operation from conventional 60 cycle A.C. wiring circuits and includes switching means such as a controlled rectifier in series with the load, the load, which is the heater element, pulse forming means to produce pulses in synchronism with the applied A.C. and including the thermistor for selectively controlling the switching means during each A.C. cycle in accordance with the instantaneous stream temperature. The timing of the control pulses is selected close to the point of voltage polarity reversal of the applied A.C. to minimize the switching transient at the switching means. Excessive switching transients are sources of radio frequency interference which interfere with radio programming, a frequent pastime of patrons of a beauty parlor.

In another embodiment, a thermistor senses ambient temperature to apply power to the heater for intervals that are varied in accordance with temperature. Supply voltage changes are also directly compensated by the self heating action of the thermistor.

Additional features and advantages in the mounting and performance of the solid state circuitry and in the physical arrangement of the hair dryer of this invention will be apparent from the following description and claims, and are illustrated in the accompanying drawings which show an illustrative embodiment of the present invention.

In the accompanying drawings forming a part of the specification, and in which like numerals are employed to designate like parts throughout the same.

FIG. 1 is a perspective front view of a hair dryer representing a typical embodiment of the invention;

FIG. 2 is a fragmentary perspective rear view of the hair dryer of FIG. 1;

FIG. 3 is a vertical section through the blower unit of the hair dryer;

FIG. 4 is a developed fragmentary transverse view through the blower, and is taken generally as indicated on the line 4—4 of FIG. 3 to show the heater and control circuit mounting;

FIG. 5 is a diagram of a solid state control circuit used in the hair dryer;

FIG. 5A is a display of the wave forms existing in the circuit of FIG. 5;

FIG. 6 is a fragmentary circuit diagram illustrating a modified circuit of half wave rectifier type;

FIG. 6A is a fragmentary circuit diagram illustrating a modified circuit of full wave rectifier type and using a positive thermistor;

FIG. 7 is a fragmentary perspective view of a modified hair dryer arrangement;

FIG. 8 is a circuit diagram illustrating another control circuit embodiment used in the hair dryer shown in FIG. 7; and FIG. 8A is a display of the wave forms existing in the circuit of FIG. 8.

Referring now to the drawings, the invention as illustrated herein is represented as a console type hair dryer. Generally, the hair dryer consists of a free standing cabinet 10 having a goose-neck outlet duct 11 supporting a drying hood 12 and supplying heated air to the hood for effecting controlled hair drying.

There are a number of mechanical structural features in the unit. The cabinet 10 is arranged with a substantially completely open rear face 10R to receive a full size filter panel 13 which is comprised of a plastic grill 13G having a sheet 13F of filter media bonded across it. A modular power unit 14 is seated in the bottom of the cabinet 10 and has a vertical riser duct 15 connecting to the goose-neck duct 11. The power unit 14 comprises a motor 16, a fan impeller 17, an open-faced impeller housing 18 having an outlet throat 19 to connect with the riser duct, and a housing cover disc 20 having a central opening defining the air intake for the blower An exposed heater coil 21 is wound upon an insert frame assembly comprised of opposing ceramic walls 22W carried on metal mounting clips 22M that attach to the outlet throat 19 of the impeller housing 18. A temprature sensing element T, such as a thermistor for providing instantaneous thermal response, is carried at the tip of a mounting tube 23 to be disposed in the riser duct 15 at a location spaced about 3 to 7 inches from the heater element 21. The tube 23 is secured to the throat 19 and serves as a conduit for wiring that connects the thermistor T into a heater control circuit. In this illustrated embodiment, the thermistor is mounted to sense the temperature of the air stream independently of radiation thermal effects associated with the heater coil.

A control circuit, described in detail later, includes the thermistor T which serves as a temperature sensitive variable impedance means, a resistor R which serves as a voltage dropping element, and a thyristor S to serve as a switching means for controlling application of power to the heater 21 in accordance with the air stream temperature sensed by the thermistor T. The voltage dropping resistor R and the switching means S, which is here represented as a TRIAC, are phsyically supported on an insulating board 24 mounted across a wall opening in the impeller housing 18 at a location upstream of the heater 21. The circuit board 24' supports other circuit elements exteriorly. The air being circulated by the blower first flows across and cools the TRIAC S, then the resistor R and finally the heater coil 21. Another feature in the control circuit is that the heater coil generally operates at a temperature of about 600° F., substantially below the glow range for this element, which is about 900 to 1000° F. This prolongs the life of the element. Since the heater coil does not glow red, its heat radiation effect is minimized and the thermistor T accurately senses the actual stream temperature.

One of the features of the control circuit, which as here illustrated is all solid state, is its substantially instantaneous thermal response. This enables the steady state stream temperature to be controlled within desirably narrow limits, for example, 124° F.±1° F. Of equal importance to the comfort of the patron is the fast warm up of the unit on initial start up. Warm up is almost instantaneous, and temperature control is achieved with substantially no thermal overshoot. This control is achieved by virtue of the low heat capacity and hence the fast thermal response of both the thermistor T and the heating element 21 coupled with the accuracy, reliability and fast response of the electronic control circuitry.

Finally, it should be noted that since the thermistor directly senses the actual temperature level of the air stream after passing the heater, any variations in air temperature which occur upstream of the heater are automatically compensated so that the operating temperature of the heated air stream can be selected and maintained at any desired level substantially independently of the normal range of ambient conditions.

One embodiment for the control circuit suited for direct plug in to a conventional 115 volt, 60 cycle, A.C. power source is shown in FIG. 5. The circuit has a pair of A.C. buses 25, one of which has a main switch 26 controlled by a clock timer 27 in the usual fashion. An indicator light 28 and the fan motor 16 are shown bridged across the A.C. buses 25.

The control circuit has a first circuit path between the A.C. buses and consisting of the heater element 21 and the controlled switching means S connected in series with the heater to carry the heater load current. In this embodiment, the electronic switching means S is a Triac that functions as a full wave controlled rectifier, the Triac being a composite circuit element equivalent to an inverse parallel silicon controlled rectifier (SCR) combination having a single gate.

A parallel circuit path is provided between the A.C. buses 25 and includes a clipper circuit comprised of a voltage dropping network which includes the resistor R connected in series with a voltage regulating element 29 here shown as a Zener diode. To provide that the network exhibit a current-leading characterisitc, for a purpose explained hereinafter, a capacitor 30 is provided in parallel with the resistor R. The voltage is controlled at the juncture 29J by the clipper action of the Zener diode 29 to provide a rectangular wave. A differentiator network for responding to this rectangular wave includes a voltage dividing resistance combination connected in series with a capacitor 31, the capacitor 31 being connected to the floating juncture 29J of the Zener diode to respond to rapid voltage changes thereat and generate corresponding voltage pulses which are applied across the voltage divider resistances 32, 33 and T. Member 32, which may be a potentiometer, is used in the final calibration of the circuit and may be replaced by a fixed resistor of suitable value. Member 33 provides an adjustable resistor for setting the apparatus to maintain a desired optimum temperature. It is controlled by the temperature selector knob 34 shown at the top of the cabinet in FIG. 1.

The thermistor T which has a negative temperature coefficient of resistance is connected in the voltage divider to establish a higher voltage pulse signal level at the thermistor junction 32J when the air stream temperature decreases and to establish a lower voltage pulse signal level at the junction when the air stream temperature increases. The voltage pulses at the thermistor junction are presented to a bilateral triggering device 35 which connects to the gate of the Triac S. The triggering device 35 blocks transmission to the Triac S of all voltage pulses below the threshold level at which it is designed to undergo non-destructive breakdown and transmit an actuating signal to the gate of the Triac. In this full wave embodiment, a silicon bilateral switch SBS is used as the triggering device.

In general, the circuit operation is such that the voltage pulses developed at the thermistor junction are of a higher signal level when the air stream temperature falls. During a positive lobe of the A.C. wave applied across the Triac, a positive pulse is gated through the triggering device 35 to actuate the Triac S if the air stream temperature is low enough to cause such pulse to be of sufficient signal level to exceed the threshold level of the bilateral switch. The Triac then becomes conducting and conducts only until the current flowing through the heater falls to substantially zero at the end of this positive lobe. During a negative lobe of the A.C. wave applied across the Triac, a negative pulse is gated to the Triac if the air stream temperature is still low enough to cause the negative pulse to be of sufficient signal level. Again, the Triac conducts only till the end of this negative lobe. Thus, during each lobe the signal determines whether or not the Triac will allow current flow through the heater coil 21.

The specific operation of the circuit is better illustrated in conjunction with the time line wave forms shown in FIG. 5A. The applied A.C. wave is shown at 36, the rectangular wave developed at the Zener diode junction 29J is shown at 37, the output pulses developed across the resistance combination of the differentiator circuit are shown at 38P and 38N, the voltage pulses developed at the thermistor junction 32J for a condition of adequate air stream temperature are shown at 138P and 138N and are of substantially identical shape to the pulses 38P and 38N, the voltage pulses developed at the thermistor junction 32J on breakdown of the triggering means are shown at 39P, 39N and are characterized by a sharply falling trailing edge, the voltage developed across the Triac S during conduction intervals is shown at 40, and the load voltage across the heater element 21 during positive lobe and negative lobe conduction intervals is shown at 41P and 41N.

It is to be noted that the current-leading characteristic of the voltage dropping network for the Zener diode advances the phase of the rectangular wave 37 to lead the applied A.C. wave slightly and thereby produce voltage pulses that trigger the Triac S substantially in synchronism with the zero or phase reversal region of the A.C. wave applied across the Triac. The switching transient developed at the Triac S and therefore present in the A.C. buses 25 is thereby minimized so that radio frequency interference is not objectionable. This is an important advantage in beauty parlor operations where radios are frequently played from the same circuits that supply electric power to the hair dryer.

Typical values and component designations for the circuit elements shown in the circuit diagram of FIG. 5 are as follows:

| | |
|---|---|
| Switching means S | Triac GE SC46B. |
| Thermistor T | 2200 ohm at 25° C. |
| Resistor R | 2400 ohm—7 watts. |
| Heater 21 | 820 watts. |
| Zener diode 29 | 14 volt—1 watt. |
| Capacitor 30 | 0.22 mfd.—200 v. |
| Capacitor 31 | 1 mfd.—50 v. |
| Resistor 32 | 1K. |
| Resistor 33 | 500 ohm—2 watts. |
| Triggering device 35 | SBS GE No. D13E1. |

Whereas, the arrangement of FIG. 5 is full wave, an alternative embodiment providing half wave operation is shown fragmentally in FIG. 6 wherein the switching device S' is a conventional silicon controller rectifier (SCR), the triggering device 35' is a slicon unilateral switch, the heater 21' is selected to provide lower resistance in view of the higher current in the duty cycle, and the remaining circuit elements may be the same.

A modified full wave embodiment of the control circuit is shown fragmentally in FIG. 6A wherein a positive thermistor having a positive temperature coefficient of resistance is shown at T' connected between the capacitor 31 and the junction 32J. Resistance elements are shown at 32' and 33', element 32' being a fixed resistor and element 33' having a greater range of adjustment to handle initial calibration and individual temperature selection for each patron.

In another hair dryer embodiment which is shown fragmentally in FIG. 7, the thermistor T is disposed in a mounting tube 123 which locates the thermistor to sense ambient temperature. As shown, the thermistor T is disposed at the broad open rear face 10R of the cabinet 10 to sense the ambient temperature of the air entering the cabinet.

A circuit embodiment used with the hair dryer of FIG. 7 is shown in FIG. 8 wherein the heater 21 is energized through separate circuit paths during alternate lobes of the applied A.C. voltage. The circuit portion designated generally at 50 is responsive to the positive lobe 36P and the circuit portion designated generally at 51 is responsive to the negative lobe 36N, each to provide a corresponding current pulse through the heater element 22.

The circuit portion 50 is herein designated a settable control circuit as it includes a selectively settable potentiometer 52 for establishing the duration of the energy flow in each positive lobe independently of the air temperature. The circuit portion 51 is herein designated a compensation control circuit as it includes the automatically responsive temperature sensing element T, here shown as a negative thermistor for establishing the duration of the energy flow in each negative lobe in accordance with the air temperature at the particular location of the thermistor. The compensation circuit 51 also corrects automatically for changes in supply voltage.

In the operation of the control circuit 50 during a positive lobe, as represented in FIG. 8A, the line voltage is rectified by diode 53 and divided between resistor 54 and the parallel combinations of resistor 55, unijunction transistor 56 and resistor 57 and of potentiometer 52 and capacitor 58. Resistor 57 is of relatively low resistance (e.g. 47 ohms) and the transistor 56 is of relatively high resistance (e.g. 10,000 ohms). Within this transistor 56, the resistance is split approximately 30 percent from the top to the emitter lead 56E and 70 percent from the emitter lead to the bottom providing a corresponding division of voltage in this branch. A control rectifier 59 here shown as an SCR has its control gate 59G connected to the junction 56J between the transistor 56 and the resistor 57. Normally, the current flow through the transistor 56 is minimal and the voltage at the junction 56J is below the threshold level for firing the SCR 59.

During the positive lobe of the applied voltage, the capacitor charges up to peak voltage, as indicated by the line 60, through the potentiometer 52 until the capacitor voltage as applied to the emitter lead 56E reaches the threshold curve 61 for firing the transistor which becomes conducting to allow the capacitor 58 to deliver a discharge current surge through the resistor 57. The voltage at the junction 56J rises sharply as indicated at 62 in FIG. 8A to turn on the SCR 59.

The voltage on the anode of the SCR 59 is shown rising along the line 63 and falling to zero as indicated at 64 at the start of conduction. The voltage across the heater rises abruptly along the line 65 at the start of conduction and follows the line 66 to the end of the positive lobe.

Variation of the duration of the load heating intervals of this control circuit 50 during each positive lobe 36P is controlled by selective setting of the potentiometer 52, this being under the control of the patron. Thus, if the resistance value of the potentiometer 52 is set higher to limit the charging current to capacitor 58, the voltage rise is along the line 60' to intersect the threshold line at a later point in the positive lobe and trigger discharge of the capacitor 58 to produce a pulse 62' that starts conduction of the SCR. In this latter situation, the voltage on the anode of the SCR 59 follows the line 63 and falls along the line 64' and the voltage across the heater rises along the line 65' and then follows the line 66.

During the negative lobe of the applied voltage, the compensation circuit 51 functions in an analogous manner but the firing time in this instance is determined by the resistance value of the thermistor T. During a negative lobe, the line voltage is rectified by diode 153 and divided between resistor 154 and parallel combinations of resistor 155, unijunction transistor 156 and resistor 157 and of series resistors 152A, 152B and of capacitor 158. The thermistor T and a parallel resistor 152C are tapped from the junction 152J between resistors 152A and 152B so that the voltage available to charge the capacitor is determined by the current drain through the thermistor.

A control rectifier 159, here shown as an SCR, has its control gate 159G connected to the junction 156J. The voltage developed across the resistor 157 is very low when the transistor 156 is not conducting so that the SCR 159 is prevented from conducting.

When the voltage developed across the capacitor, as indicated by the line 160, intersects the threshold curve 161 for firing the transistor 156, the capacitor discharges through the resistor 157 to develop an output pulse 162 that turns on the SCR 159 which then conducts for the remainder of the cycle. The voltage on the anode of SCR 159 is shown at 163 and the voltage developed across the heater 21 is shown at 166.

Thus, the time of turn-on determines the heating effect. It is desired that the control of the heater compensate for changes in the supply voltage. In the circuit arrangement of FIG. 8, the thermistor T performs this function in that an increase in the applied voltage causes an increased current flow through the thermistor T to produce a self heating effect. As the thermistor heats up, its resistance decreases so that a smaller proportion of the applied voltage is available to charge the capacitor 158. Therefore, the capacitor is charged more slowly by reason of the thermistor's self heating and the firing time is thereby delayed so that the higher applied voltage produces no greater heating of the element 21.

Finally, the thermistor T is arranged to respond to the air temperature. When the air temperature increases, the resistance of the thermistor falls drawing more current and dropping the voltage available to charge the capacitor 158. The capacitor now charges more slowly to turn on the SCR 159 at a later point and provide less power to the heater. Correspondingly, as the air temperature decreases, earlier turn-on of the SCR 159 is effected to provide more power to the heater.

What is claimed is:

1. In an electric hair dryer having a forced air heating system, said dryer including framing structure mounting a shrouded blower unit, an air duct leading from said blower unit and a hood connected to said air duct, said dryer including an electric heater element disposed in said air duct in direct heat exchange relation with air flowing therethrough, and a control circuit having temperature sensitive variable impedance means responsive to the air temperature at a point in said duct downstream of said heater element to determine an A.C. signal level in accordance with the air temperature at said point and a signal time close to polarity reversal of applied voltage, and switching means selectively responsive to said signal level to control energization of said heater element.

2. In an electric hair dryer in accordance with claim 1 wherein said variable impedance means is a thermistor and said control circuit includes pulsing means for periodically applying a signal pulse to said thermistor to produce an output pulse at a temperature dependent signal level for selectively energizing said heater element.

3. In an electric hair dryer in accordance with claim 2 and wherein said control circuit is energizable from a source of A.C. power, said pulsing means includes a voltage dropping network in series with a unidirectional voltage limiting element to develop a rectangular wave for each cycle of applied A.C. power and a differentiator network including said thermistor is responsive to the rectangular wave to produce said signal pulses at a frequency synchronous to the frequency of the applied A.C. power.

4. In an electric hair dryer in accordance with claim 3 and wherein said switching means includes a controlled rectifier connected in series with said heater element to be rendered conductive for an interval determined by the voltage level of the applied A.C. power, triggering means of a non-destructive voltage breakdown type receives said output pulses to control energization of said rectifier, and said voltage dropping network is of current leading type to time the energization of said controlled rectifier to be substantially in phase with the voltage polarity reversal of the applied A.C. power at the controlled rectifier.

5. An electric hair dryer including a hood, an air duct leading into said hood and a shrouded blower unit discharging into the air duct, a fluid stream heating system that includes an electric heater element disposed in heat exchange relation with a fluid stream, a control circuit having temperature sensitive variable impedance means responsive to the fluid at a predetermined location, first means for periodically applying a signal to said variable impedance means to produce an output signal at a level dependent upon the fluid temperature at said location, and at a time close to the polarity reversal of applied voltage and switching means selectively responsive to each output signal in accordance with the level thereof to energize said heater element, said heater element and said variable impedance means being disposed in said duct and each directly exposed to air flowing through said duct, and said heater element including a resistance wire formed about a frame mounted within said duct and means for energizing said heater element to a maximum temperature level substantially below the glow range of said element whereby thermal radiation effects of said heater element on said temperature sensitive variable impedance means are minimized.

6. In an electric hair dryer having a forced air heating system, said dryer including framing structure mounting a shrouded blower unit, an air duct leading from said blower unit and a hood connected to said air duct, said dryer including a control circuit having an electric heater element disposed in said air duct in direct heat exchange relation with air flowing therethrough, and a control circuit having a thermistor responsive to the air temperature at a point in said duct downstream of said heater element to determine a signal level in accordance with the air temperature at said point, pulsing means for periodically applying a signal pulse to said thermistor to produce an output pulse at a temperature dependent signal level for selectively energizing said heater element, and switching means selectively responsive to said signal level to control energization of said heater element, said control circuit being energizable from a source of A.C. power, said pulsing means including a voltage dropping network in series with a unidirectional voltage limiting element to develop a rectangular wave for each cycle of applied A.C. power and a differentiator network including said thermistor being responsive to the rectangular wave to produce said signal pulses at a frequency synchronous to the frequency of the applied A.C. power.

7. In an electric hair dryer in accordance with claim 6 and wherein said switching means includes a controlled rectifier connected in series with said heater element to be rendered conductive for an interval determined by the voltage level of the applied A.C. power, triggering means of a non-destructive voltage breakdown type receives said output pulses to control energization of said rectifier, and said voltage dropping network is of current leading type to time the energization of said controlled rectifier to be substantially in phase with the voltage polarity reversal of the applied A.C. power at the controlled rectifier.

8. In a fluid stream heating system that includes an electric heater element disposed in heat exchange relation with a fluid stream, a control circuit having temperature sensitive variable impedance means responsive to the fluid at a predetermined location, first means for periodically applying an A.C. signal to said variable impedance means to produce an output signal at a level dependent upon the fluid temperature at said location and at a time close to the polarity reversal of applied voltage, and switching means selectively responsive to each output signal in accordance with the level thereof to energize said heater element.

9. In a fluid stream heating system in accordance with claim 8 and wherein said control circuit is energizable from a source of A.C. power, said first means responds to said source to produce signals at a frequency synchronous with the frequency of said source and said switching means includes a controlled rectifier connected in series with said heater element to be rendered conducting for an interval determined by the voltage level of the applied A.C. power.

10. In a fluid stream heating system in accordance with claim 9 wherein said variable impedance means is at a downstream location in said stream.

11. In a fluid stream heating system in accordance with claim 10 wherein said first means includes a voltage dropping network in series with a unidirectional voltage limiting element to develop a rectangular wave, and a differentiator network responsive to the rectangular wave to develop said output signals and including said variable impedance means to determine the level of the output signals.

12. In a fluid stream heating system in accordance with claim 11 wherein said voltage dropping network is of current leading type to time the energization of said cntrolled switch to be substantially in phase with the voltage polarity reversal of the applied A.C. power at the controlled switch.

13. In a fluid stream heating system in accordance with claim 9 wherein triggering means of a non-destructive voltage breakdown type receives said output signals to control energization of said rectifier.

14. In a fluid stream heating system in accordance with claim 9 wherein said variable impedance means is at a location to sense ambient fluid temperature prior to heating of the fluid by said heater element.

15. In a fluid stream heating system in accordance with claim 9 and wherein said control circuit has manually settable variable impedance means, second means for periodically applying a signal to said settable variable impedance means at a frequency synchronous with the frequency of said source to produce an output signal at a level dependent upon the settable variable impedance means, said second means operating in alternating relation to said first means on opposite polarity lobes of the applied A.C. power.

16. An electric hair dryer in accordance with claim 8 and wherein said dryer includes a hood, an air duct leading into said hood and a shrouded blower unit discharging into the air duct, said heater element and said variable impedance means being disposed in said duct and each directly exposed to air flowing through said duct.

17. An electric hair dryer in accordance with claim 16 and wherein said heater element includes a resistance wire formed about a frame mounted within said duct and means for energizing said heater element to a maximum temperature level substantially below the glow range of said element whereby thermal radiation effects of said heater element on said temperature sensitive variable impedance means are minimized.

18. An electric hair dryer in accordance with claim 16 and wherein a cabinet mounts said hood externally and said air duct and blower unit internally, said cabinet having an open face substantially full height thereof and spanned by a panel of filter media to provide a large area air intake region for said blower unit.

19. In a fluid stream heating system that includes an electric heater element disposed in heat exchange relation with a fluid stream, and a control circuit energizable from an A.C. power source that periodically applies A.C. energy to said control circuit, said control circuit including temperature sensitive variable impedance means responsive to the fluid temperature at a predetermined location in said fluid stream, selectively operable controlled rectifier means to effect application of said A.C. energy to said heater element during any A.C. energy cycle thereof, and means operating in conjunction with said variable impedance means selectively to trigger said controlled rectifier means during each cycle of the applied A.C. energy in accordance with the fluid temperature at said location and at a time close to polarity reversal of applied voltage.

20. In an arrangement in accordance with claim 19 wherein said variable impedance means is connected in self-heating relationship in said control circuit to compensate for changes in the voltage supplied from said source to said heater element.

21. An electric hair dryer in accordance with claim 19 and wherein said dryer includes a hood, an air duct leading into said hood and a shrouded blower unit discharging into the air duct, said heater element and said variable impedance means being disposed in said duct and each directly exposed to air flowing through said duct.

22. In a fluid stream heating system that includes an electric heater element disposed in heat exchange relation with a fluid stream, a control circuit having temperature sensitive variable impedance means at a downstream location in said stream responsive to the fluid at said location, said control circuit being energizable from a source of A.C. power, first means responsive to said source to produce signals at a frequency synchronous with the frequency of said source for periodically applying a signal to said variable impedance means to produce an output signal at a level dependent upon the fluid temperature at said location and switching means including a controlled rectifier connected in series with said heater element to be rendered conducting for an interval determined by the voltage level of the applied A.C. power and selectively responsive to each output signal in accordance with the level thereof to energize said heater element, said first means including a voltage dropping network in series with a unidirectional voltage limiting element to develop a rectangular wave, and a differentiator network repsonsive to the rectangular wave to develop said output signals and including said variable impedance means to determine the level of the output signals.

23. In a fluid stream heating system in accordance with claim 22 wherein said voltage dropping network is of current leading type to time the energization of said controlled switch to be substantially in phase with the voltage polarity reversal of the applied A.C. power at the controlled switch.

24. In a fluid stream heating system that includes an electric heater element disposed in heat exchange relation with a fluid stream, a control circuit having temperature sensitive variable impedance means responsive to the fluid at said location, said control circuit is energizable from a source of A.C. power, first means responsive to said source to produce signals at a frequency synchronous with the frequency of said source for periodically applying a signal to said variable impedance means to produce an output signal at a level dependent upon the fluid temperature at said location, and switching means including a controlled rectifier connected in series with said heater element to be rendered conducting for an interval determined by the voltage level of the applied A.C. power and selectively responsive to each output signal in accordance with the level thereof to energize said heater element, said control circuit having manually settable variable impedance means, second means for periodically applying a signal to said settable variable impedance means at a frequency synchronous with the frequency of said source to produce an output signal at a level dependent upon the settable variable impedance means, said second means operating in alternating relation to said first means on opposite polarity lobes of the applied A.C. power.

References Cited

UNITED STATES PATENTS

| | | | |
|---|---|---|---|
| 2,201,229 | 5/1940 | Gross | 34—99 XR |
| 3,149,224 | 9/1964 | Horne et al. | 219—505 XR |
| 3,235,711 | 2/1966 | Bergen et al. | |
| 3,303,325 | 2/1967 | Hubrich | 34—96 |
| 3,337,792 | 8/1967 | Engelson | 219—501 |

CARLTON R. CROYLE, *Primary Examiner.*

A. D. HERRMANN, *Assistant Examiner.*

U.S. Cl. X.R.

34—99; 219—364, 501, 505